United States Patent
Topol et al.

(10) Patent No.: US 8,834,099 B1
(45) Date of Patent: Sep. 16, 2014

(54) LOW NOISE COMPRESSOR ROTOR FOR GEARED TURBOFAN ENGINE

(71) Applicant: United Technologies Corporation, Hartford, CT (US)

(72) Inventors: David A. Topol, West Hartford, CT (US); Bruce L. Morin, Springfield, MA (US)

(73) Assignee: United Technoloiies Corporation, Hartford, CT (US)

( * ) Notice: Subject to any disclaimer, the term of this patent is extended or adjusted under 35 U.S.C. 154(b) by 36 days.

(21) Appl. No.: 14/159,760

(22) Filed: Jan. 21, 2014

Related U.S. Application Data

(63) Continuation-in-part of application No. 14/016,436, filed on Sep. 3, 2013, which is a continuation of application No. 13/360,276, filed on Jan. 27, 2012.

(51) Int. Cl.
*F01D 1/02* (2006.01)

(52) U.S. Cl.
USPC ..... 415/119; 415/181; 415/198.1; 415/199.4; 416/500; 416/DIG. 2

(58) Field of Classification Search
USPC ............ 415/119, 181, 198.1, 199.4; 416/500, 416/DIG. 2
See application file for complete search history.

(56) References Cited

U.S. PATENT DOCUMENTS

| | | | |
|---|---|---|---|
| 3,270,953 | A | 9/1966 | Jan Jerie et al. |
| 3,747,343 | A | 7/1973 | Rosen |
| 3,953,148 | A | 4/1976 | Seippel et al. |
| 4,131,387 | A | 12/1978 | Kazin et al. |
| 4,732,532 | A | 3/1988 | Schwaller et al. |
| 4,883,240 | A | 11/1989 | Adamson et al. |
| 4,968,216 | A | 11/1990 | Anderson et al. |
| 5,169,288 | A | 12/1992 | Gliebe et al. |
| 5,190,441 | A | 3/1993 | Murphy et al. |
| 5,197,855 | A | 3/1993 | Magliozzi et al. |
| 5,486,091 | A | 1/1996 | Sharma |
| 6,036,438 | A | 3/2000 | Imai |
| 6,195,983 | B1 | 3/2001 | Wadia et al. |
| 6,260,794 | B1 | 7/2001 | Rowe |
| 6,554,564 | B1 | 4/2003 | Lord |
| 7,108,485 | B2 | 9/2006 | Wobben |
| 7,694,505 | B2 | 4/2010 | Schilling |
| 7,806,651 | B2 | 10/2010 | Kennepohl et al. |
| 7,976,283 | B2 | 7/2011 | Huck |
| 7,984,607 | B2 | 7/2011 | Sharma et al. |
| 8,180,596 | B2 * | 5/2012 | Henning et al. .............. 416/500 |

OTHER PUBLICATIONS

Jane's Aero-Engines, Issue Seven, Copyright 2000, pp. 510-512, Mar. 2000.

* cited by examiner

*Primary Examiner* — Igor Kershteyn
(74) *Attorney, Agent, or Firm* — Carlson, Gaskey & Olds, PC

(57) ABSTRACT

A gas turbine engine comprises a fan and a turbine section having a first turbine rotor. The first turbine rotor drives a compressor rotor. A gear reduction effects a reduction in the speed of the fan relative to an input speed from a fan drive turbine rotor. The compressor rotor has a number of compressor blades in at least one of a plurality of rows of the compressor rotor. The blades operate at least some of the time at a rotational speed. The number of compressor blades in at least one row and the rotational speed are such that the following formula holds true for at least one row of the compressor rotor:

(the number of blades×the rotational speed)/(60 seconds/minute)≥5500 Hz; and the rotational speed being in revolutions per minute.
A compressor module and a method of designing a gas turbine engine are also disclosed.

30 Claims, 1 Drawing Sheet

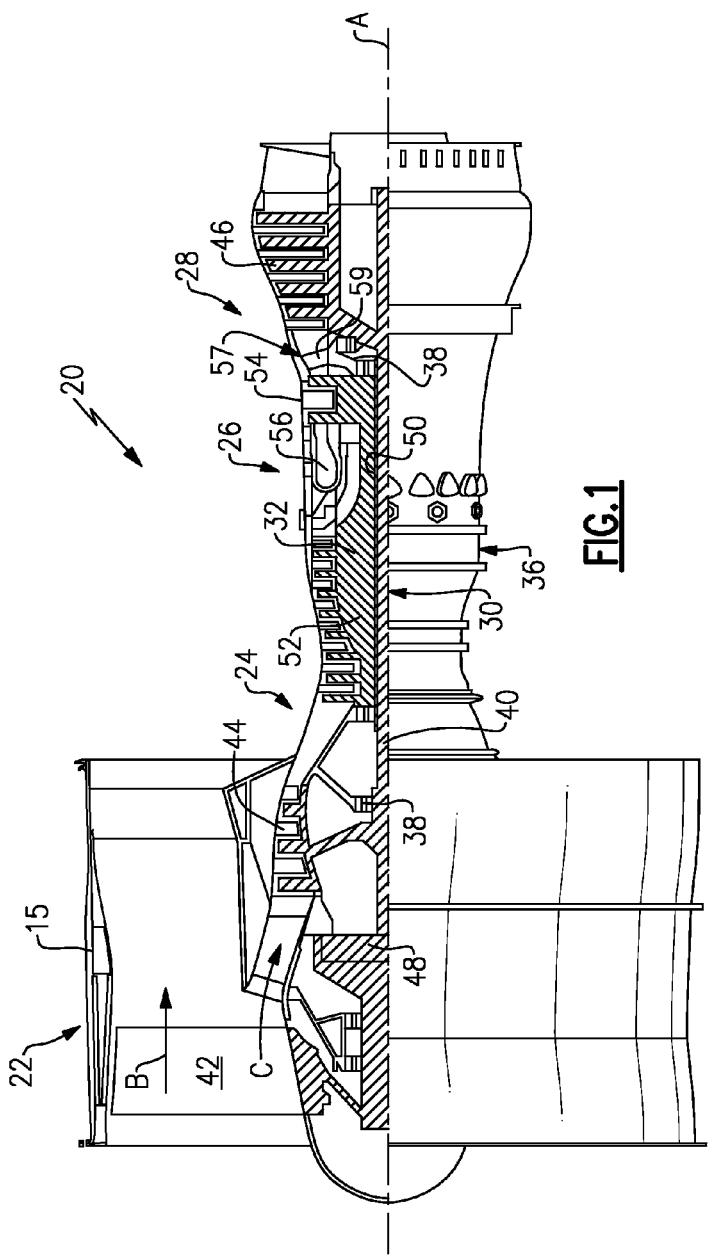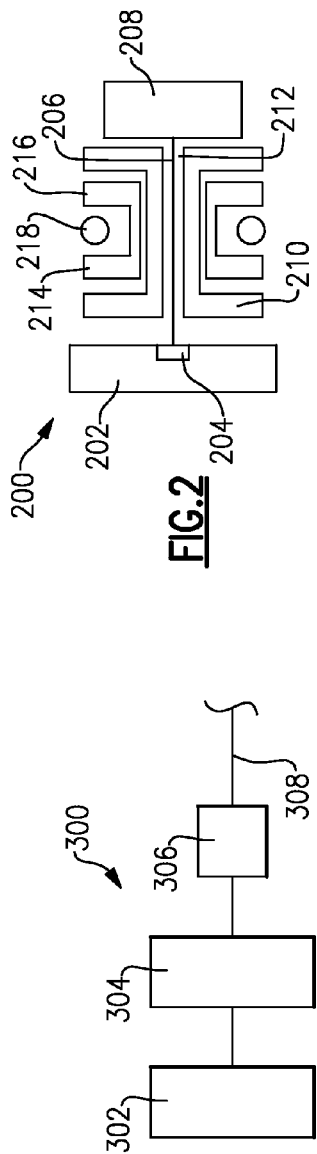

LOW NOISE COMPRESSOR ROTOR FOR GEARED TURBOFAN ENGINE

CROSS-REFERENCE TO RELATED APPLICATION

This application is a continuation-in-part of U.S. patent application Ser. No. 14/016,436, filed Sep. 3, 2013, which was a continuation of U.S. patent application Ser. No. 13/360,276, filed Sep. 28, 2012, now U.S. Pat. No. 8,632,301, issued Jan. 21, 2014.

BACKGROUND

This application relates to the design of a gas turbine engine rotor which can be operated to produce noise that is less sensitive to human hearing.

Gas turbine engines are known, and typically include a fan delivering air into a compressor. The air is compressed in the compressor and delivered downstream into a combustor section where it was mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades which rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades which rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

The noise can often be in a frequency range that is very sensitive to humans. To mitigate this problem, in the past, a vane-to-blade ratio has been controlled to be above a certain number. As an example, a vane-to-blade ratio may be selected to be 1.5 or greater, to prevent a fundamental blade passage tone from propagating to the far field. This is known as "cut-off."

However, acoustically cut-off designs may come at the expense of increased weight and reduced aerodynamic efficiency. Stated another way, by limiting the designer to a particular vane to blade ratio, the designer may be restricted from selecting such a ratio based upon other characteristics of the intended engine.

Historically, the low pressure turbine has driven both a low pressure compressor section and a fan section. More recently, a gear reduction has been provided such that the fan and low pressure compressor can be driven at distinct speeds.

SUMMARY OF THE INVENTION

In a featured embodiment, a gas turbine engine comprises a fan and a turbine section having a first turbine rotor. The first turbine rotor drives a compressor rotor. A gear reduction effects a reduction in the speed of the fan relative to an input speed from a fan drive turbine rotor. The compressor rotor has a number of compressor blades in at least one of a plurality of rows of the compressor rotor. The blades operate at least some of the time at a rotational speed. The number of compressor blades in at least one row and the rotational speed are such that the following formula holds true for at least one row of the compressor rotor:

(the number of blades×the rotational speed)/(60 seconds/minute)≥5500 Hz; and the rotational speed being in revolutions per minute.

In another embodiment according to the previous embodiment, the formula results in a number greater than or equal to about 6000 Hz.

In another embodiment according to any of the previous embodiments, the gas turbine engine is rated to produce about 15,000 pounds of thrust or more.

In another embodiment according to any of the previous embodiments, the formula holds true for the majority of the blade rows of the compressor rotor.

In another embodiment according to any of the previous embodiments, the gas turbine engine is rated to produce about 15,000 pounds of thrust or more.

In another embodiment according to any of the previous embodiments, the gear reduction has a gear ratio of greater than about 2.3.

In another embodiment according to any of the previous embodiments, the gear reduction has a gear ratio of greater than about 2.5.

In another embodiment according to any of the previous embodiments, the fan delivers air into a bypass duct, and a portion of air into the compressor rotor. A bypass ratio is defined as the volume of air delivered into the bypass duct compared to the volume of air delivered into the compressor rotor. The bypass ratio is greater than about 6.

In another embodiment according to any of the previous embodiments, the bypass ratio is greater than about 10.

In another embodiment according to any of the previous embodiments, the formula results in a number greater than or equal to about 6000 Hz.

In another embodiment according to any of the previous embodiments, the rotational speed is an approach speed.

In another embodiment according to any of the previous embodiments, the turbine section includes a higher pressure turbine rotor and the first turbine rotor. The fan drive turbine rotor is the first turbine rotor.

In another embodiment according to any of the previous embodiments, the compressor rotor is a lower pressure compressor rotor. The higher pressure turbine rotor drives a higher pressure compressor rotor.

In another embodiment according to any of the previous embodiments, the gear reduction is intermediate the first turbine rotor and the compressor rotor.

In another embodiment according to any of the previous embodiments, the gear reduction is intermediate the compressor rotor and the fan.

In another embodiment according to any of the previous embodiments, the turbine section includes three turbine rotors. The first turbine rotor and the fan drive turbine rotor are distinct rotors.

In another featured embodiment, a method of designing a gas turbine engine comprises the steps of including a first turbine rotor to drive a compressor rotor and a fan drive turbine rotor to drive a fan through a gear reduction, and selecting a number of blades in at least one row of the compressor rotor, in combination with a rotational speed of the compressor rotor, such that the following formula holds true for the at least one row of the compressor rotor:

(the number of blades×the rotational speed)/(60 seconds/minute)≥5500 Hz; and the rotational speed being in revolutions per minute.

In another embodiment according to the previous embodiment, the formula results in a number greater than or equal to about 6000 Hz.

In another embodiment according to any of the previous embodiments, the gas turbine engine is rated to produce about 15,000 pounds of thrust or more.

In another embodiment according to any of the previous embodiments, the rotational speed is an approach speed.

In another embodiment according to any of the previous embodiments, the turbine section includes a higher pressure turbine rotor and the first turbine rotor. The fan drive turbine rotor is the first turbine rotor.

In another embodiment according to any of the previous embodiments, the compressor rotor is a lower pressure compressor rotor. The higher pressure turbine rotor drives a higher pressure compressor rotor.

In another embodiment according to any of the previous embodiments, the gear reduction is intermediate the first turbine rotor and the compressor rotor.

In another embodiment according to any of the previous embodiments, the gear reduction is intermediate the compressor rotor and the fan.

In another embodiment according to any of the previous embodiments, the turbine section includes three turbine rotors. The first turbine rotor and the fan drive turbine rotor are distinct rotors.

In another featured embodiment, a compressor module comprises a compressor rotor having at least a first blade row that includes a number of blades. The first blade row is capable of rotating at a rotational speed, so that when measuring the rotational speed in revolutions per minute:

(the number of blades×the rotational speed)/(60 seconds/minute)≥5500 Hz.

In another embodiment according to the previous embodiment, the rotational speed is an approach speed.

In another embodiment according to any of the previous embodiments, the formula results in a number greater than or equal to about 6000 Hz.

In another embodiment according to any of the previous embodiments, the formula results in a number greater than or equal to about 6000 Hz.

In another featured embodiment, a method of designing a gas turbine engine comprises providing a fan and a turbine section having a first turbine rotor. The first turbine rotor drives a compressor rotor. A gear reduction effects a reduction in the speed of the fan relative to an input speed from a fan drive turbine rotor. The compressor rotor has a number of compressor blades in at least one of a plurality of rows of the compressor rotor. The blades operate at least some of the time at a rotational speed. The number of compressor blades in at least one row and the rotational speed are such that the following formula holds true for at least one row of the compressor rotor:

(the number of blades×the rotational speed)/(60 seconds/minute)≥5500 Hz; and the rotational speed being in revolutions per minute.

These and other features of this application will be best understood from the following specification and drawings, the following of which is a brief description.

BRIEF DESCRIPTION OF THE DRAWINGS

FIG. 1 shows a gas turbine engine.
FIG. 2 shows a second embodiment.
FIG. 3 shows yet another embodiment.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7° R)]^{0.5}$. The "Low corrected fan tip speed" as disclosed herein according to one non-limiting embodiment is less than about 1150 ft/second.

The use of the gear reduction between the low speed spool and the fan allows an increase of speed to the low pressure compressor. In the past, the speed of the low pressure turbine and compressor has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the low pressure turbine and compressor speeds caused by a desire to not have unduly high fan speeds.

It has been discovered that a careful design between the number of rotating blades, and the rotational speed of the low pressure turbine can be selected to result in noise frequencies that are less sensitive to human hearing. The same is true for the low pressure compressor 44.

A formula has been developed as follows:

(blade count×rotational speed)/(60 seconds/minute)≥5500 Hz.

That is, the number of rotating blades in any low pressure turbine stage, multiplied by the rotational speed of the low pressure turbine 46 (in revolutions per minute), divided by (60 seconds/minute) should be greater than or equal to 5500 Hz. The same holds true for the low pressure compressor stages. More narrowly, the amounts should be above 6000 Hz. A worker of ordinary skill in the art would recognize that the (60 seconds/minute) factor is to change revolutions per minute to Hertz, or revolutions per one second.

The operational speed of the low pressure turbine 46 and low pressure compressor 44 as utilized in the formula should correspond to the engine operating conditions at each noise certification point defined in Part 36 or the Federal Airworthiness Regulations. More particularly, the rotational speed may be taken as an approach certification point as defined in Part 36 of the Federal Airworthiness Regulations. For purposes of this application and its claims, the term "approach speed" equates to this certification point.

It is envisioned that all of the rows in the low pressure turbine 46 meet the above formula. However, this application may also extend to low pressure turbines wherein the majority of the blade rows in the low pressure turbine meet the above formula, but perhaps some may not. The same is true for low pressure compressors, wherein all of the rows in the low pressure compressor 44 would meet the above formula. However, the application may extend to low pressure compressors wherein only the majority of the blade rows in the low pressure compressor meet the above formula, but some perhaps may not.

This will result in operational noise that would be less sensitive to human hearing.

In embodiments, it may be that the formula can result in a range of greater than or equal to 5500 Hz, and moving higher. Thus, by carefully designing the number of blades and controlling the operational speed of the low pressure turbine 46 (and a worker of ordinary skill in the art would recognize how to control this speed) one can assure that the noise frequencies produced by the low pressure turbine are of less concern to humans.

The same holds true for designing the number of blades and controlling the speed of the low pressure compressor 44. Again, a worker of ordinary skill in the art would recognize how to control the speed.

In embodiments, it may be only the low pressure turbine rotor 46, or the low pressure compressor rotor 44 which is designed to meet the meet the above formula. On the other hand, it is also possible to ensure that both the low pressure turbine 46 and low pressure compressor 44 meet the above formula.

This invention is most applicable to jet engines rated to produce 15,000 pounds of thrust or more. In this thrust range, prior art jet engines have typically had frequency ranges of about 4000 hertz. Thus, the noise problems as mentioned above have existed.

Lower thrust engines (<15,000 pounds) may have operated under conditions that sometimes passed above the 4000 Hz number, and even approached 6000 Hz, however, this has not been in combination with the geared architecture, nor in the higher powered engines which have the larger fans, and thus the greater limitations on low pressure turbine or low pressure compressor speed.

FIG. 2 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured, mounted and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

FIG. 3 shows yet another embodiment 300 wherein a fan rotor 302 and a first stage compressor 304 rotate at a common speed. The gear reduction 306 (which may be structured,

The invention claimed is:

1. A gas turbine engine comprising:
a fan and a turbine section having a first turbine rotor, the first turbine rotor to drive a compressor rotor;
a gear reduction effecting a reduction in the speed of the fan relative to an input speed from a fan drive turbine rotor;
the compressor rotor having a number of compressor blades in at least one of a plurality of rows of the compressor rotor, and the blades operating at least some of the time at a rotational speed, and the number of compressor blades in the at least one row and the rotational speed being such that the following formula holds true for the at least one row of the compressor rotor:

(the number of blades×the rotational speed)/(60 seconds/minute)≥5500 Hz; and the rotational speed being in revolutions per minute.

2. The gas turbine engine as set forth in claim 1, wherein the formula results in a number greater than or equal to about 6000 Hz.

3. The gas turbine engine as set forth in claim 2, wherein the gas turbine engine is rated to produce about 15,000 pounds of thrust or more.

4. The gas turbine engine as set forth in claim 1, wherein the formula holds true for the majority of the blade rows of the compressor rotor.

5. The gas turbine engine as set forth in claim 1, wherein the gas turbine engine is rated to produce about 15,000 pounds of thrust or more.

6. The gas turbine engine as set forth in claim 1, wherein the gear reduction has a gear ratio of greater than about 2.3.

7. The gas turbine engine as set forth in claim 6, wherein the gear reduction has a gear ratio of greater than about 2.5.

8. The gas turbine engine as set forth in claim 1, wherein the fan delivers air into a bypass duct, and a portion of air into the compressor rotor, with a bypass ratio defined as the volume of air delivered into the bypass duct compared to the volume of air delivered into the compressor rotor, and the bypass ratio being greater than about 6.

9. The gas turbine engine as set forth in claim 8, wherein the bypass ratio is greater than about 10.

10. The gas turbine engine as set forth in claim 9, wherein the formula results in a number greater than or equal to about 6000 Hz.

11. The gas turbine engine as set forth in claim 1, wherein the rotational speed being an approach speed.

12. The gas turbine engine as set forth in claim 1, wherein the turbine section including a higher pressure turbine rotor and the first turbine rotor, and the fan drive turbine rotor being the first turbine rotor.

13. The gas turbine engine as set forth in claim 12, wherein the compressor rotor is a lower pressure compressor rotor, and the higher pressure turbine rotor driving a higher pressure compressor rotor.

14. The gas turbine engine as set forth in claim 12, wherein the gear reduction is intermediate the first turbine rotor and the compressor rotor.

15. The gas turbine engine as set forth in claim 12, wherein the gear reduction is intermediate the compressor rotor and the fan.

16. The gas turbine engine as set forth in claim 1, wherein the turbine section includes three turbine rotors, with the first turbine rotor and the fan drive turbine rotor being distinct rotors.

17. A method of designing a gas turbine engine comprising the steps of:
including a first turbine rotor to drive a compressor rotor and a fan drive turbine rotor to drive a fan through a gear reduction, and selecting a number of blades in at least one row of the compressor rotor, in combination with a rotational speed of the compressor rotor, such that the following formula holds true for the at least one row of the compressor rotor:

(the number of blades×the rotational speed)/(60 seconds/minute)≥5500 Hz; and the rotational speed being in revolutions per minute.

18. The method as set forth in claim 17, wherein the formula results in a number greater than or equal to about 6000 Hz.

19. The method as set forth in claim 17, wherein the gas turbine engine is rated to produce about 15,000 pounds of thrust or more.

20. The method as set forth in claim 17, wherein the rotational speed is an approach speed.

21. The method as set forth in claim 17, wherein the turbine section including a higher pressure turbine rotor and the first turbine rotor, and the fan drive turbine rotor being the first turbine rotor.

22. The method as set forth in claim 21, wherein the compressor rotor is a lower pressure compressor rotor, and the higher pressure turbine rotor driving a higher pressure compressor rotor.

23. The method as set forth in claim 22, wherein the gear reduction is intermediate the first turbine rotor and the compressor rotor.

24. The method as set forth in claim 22, wherein the gear reduction is intermediate the compressor rotor and the fan.

25. The method as set forth in claim 17, wherein the turbine section includes three turbine rotors, with the first turbine rotor and the fan drive turbine rotor being distinct rotors.

26. A compressor module comprising:
a compressor rotor having at least a first blade row that includes a number of blades, the first blade row being capable of rotating at a rotational speed, so that when measuring the rotational speed in revolutions per minute:

(the number of blades×the rotational speed)/(60 seconds/minute)≥5500 Hz.

27. The compressor module as set forth in claim 26, wherein the rotational speed is an approach speed.

28. The compressor module as set forth in claim 27, wherein the formula results in a number greater than or equal to about 6000 Hz.

29. The compressor module as set forth in claim 26, wherein the formula results in a number greater than or equal to about 6000 Hz.

30. A method of designing a gas turbine engine comprising:
providing a fan and a turbine section having a first turbine rotor, the first turbine rotor to drive a compressor rotor;
providing a gear reduction effecting a reduction in the speed of the fan relative to an input speed from a fan drive turbine rotor;

the compressor rotor having a number of compressor blades in at least one of a plurality of rows of the compressor rotor, and the blades operating at least some of the time at a rotational speed, and the number of compressor blades in the at least one row and the rotational speed being such that the following formula holds true for the at least one row of the compressor rotor:

(the number of blades×the rotational speed)/(60 seconds/minute)≥5500 Hz; and the rotational speed being in revolutions per minute.

* * * * *

UNITED STATES PATENT AND TRADEMARK OFFICE
CERTIFICATE OF CORRECTION

PATENT NO. : 8,834,099 B1
APPLICATION NO. : 14/159760
DATED : September 16, 2014
INVENTOR(S) : David A. Topol It is certified that error appears in the above-identified patent and that said Letters Patent is hereby corrected as shown below:

Title Page, item [73]

ASSIGNEE SHOULD READ AS:

United Technologies Corporation,

Signed and Sealed this
Twenty-seventh Day of January, 2015

Michelle K. Lee
*Deputy Director of the United States Patent and Trademark Office*